Nov. 1, 1966  J. M. BENSON ETAL  3,282,085
FLUID OPERATED FILAMENT DIAMETER MEASURING DEVICE
Filed March 29, 1963  3 Sheets-Sheet 1
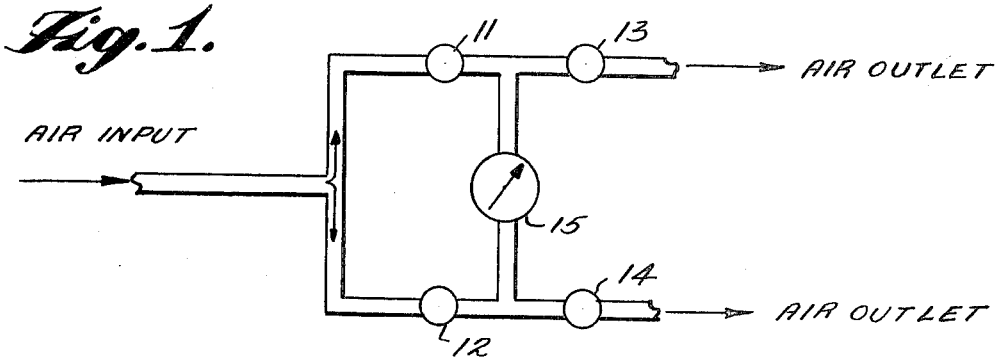
Fig.1.
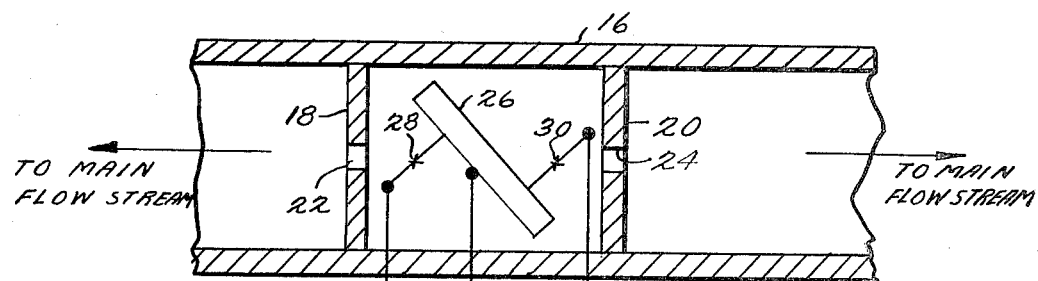
Fig.2.
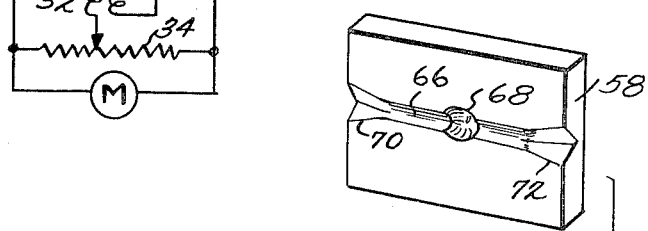
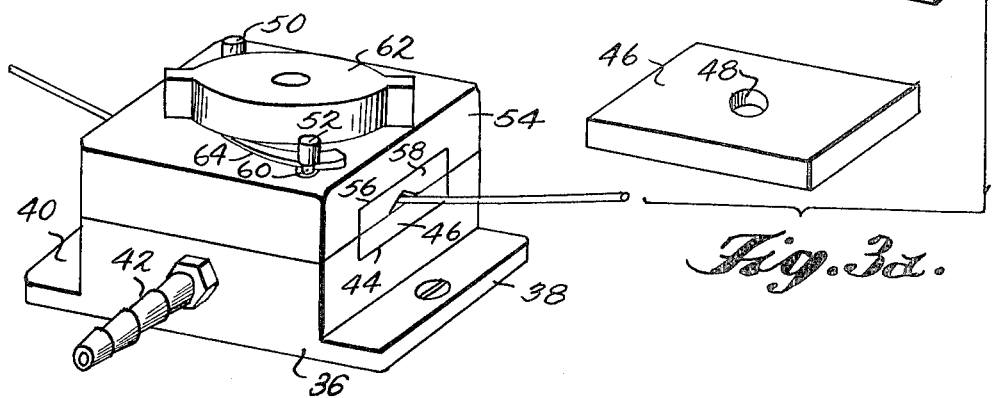
Fig.3.
Fig.3a.
INVENTORS
JAMES M. BENSON
BY GEORGE F. QUITTNER
Cushman, Darby & Cushman
ATTORNEYS

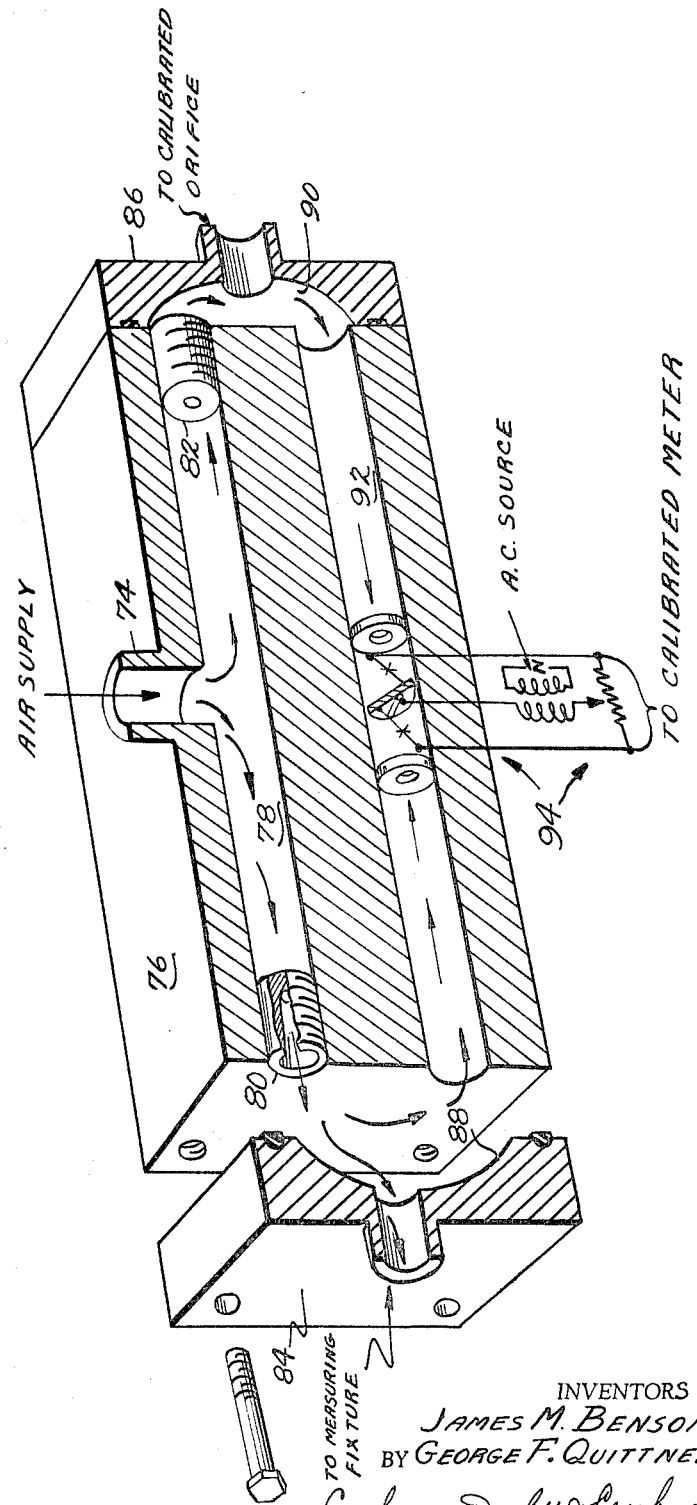

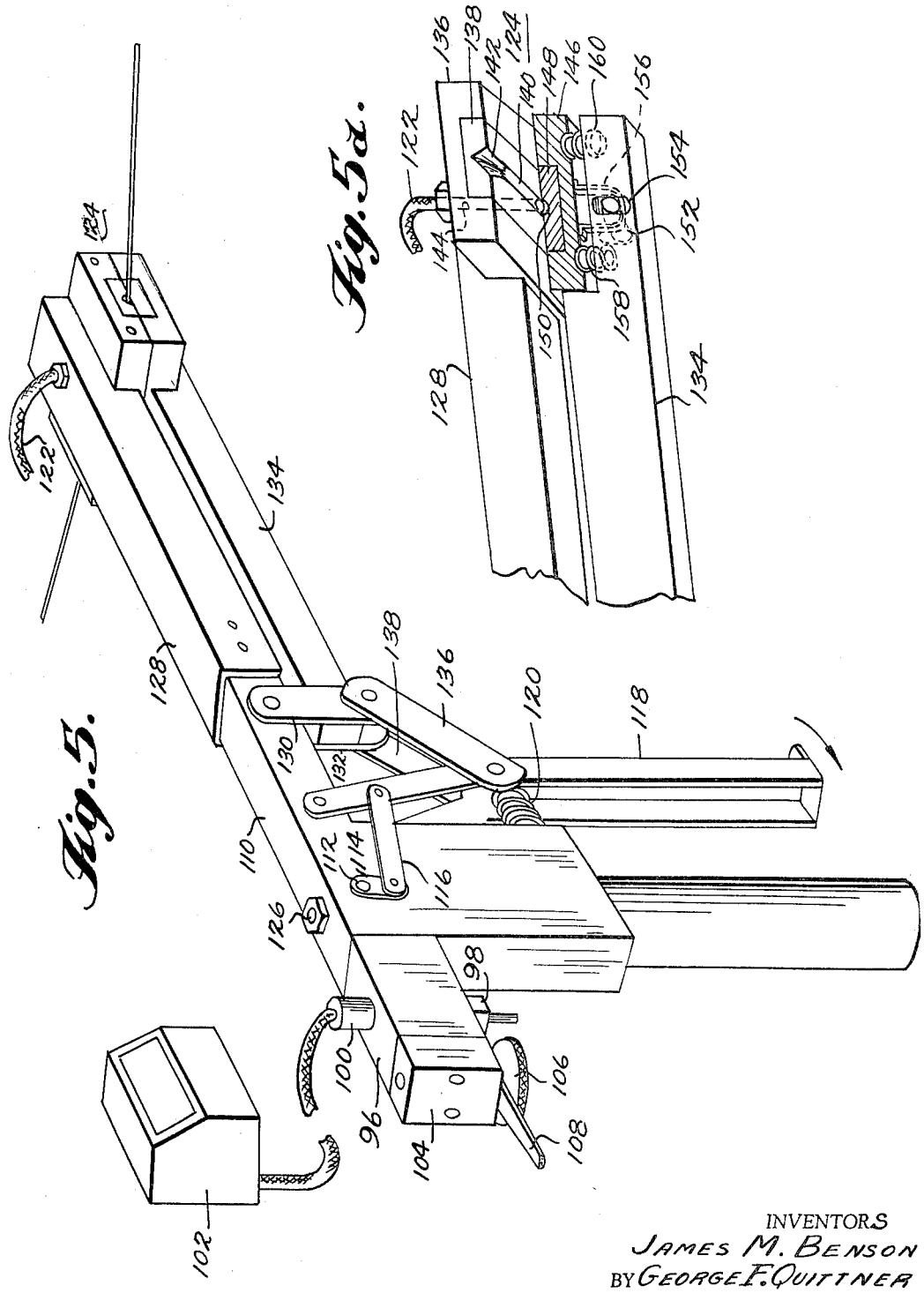

United States Patent Office 3,282,085
Patented Nov. 1, 1966

3,282,085
FLUID OPERATED FILAMENT DIAMETER
MEASURING DEVICE
James M. Benson, Hampton, Va., and George F. Quittner, Cleveland Heights, Ohio, assignors to Hastings-Raydist, Inc., Hampton, Va., a corporation of Virginia
Filed Mar. 29, 1963, Ser. No. 269,013
5 Claims. (Cl. 73—37.7)

This invention relates to apparatus for measuring the mean diameter of elongated solids such as yarn, wire, cable and the like while they are in motion during processing operations. More particularly, the invention is directed to a unique pneumatic bridge construction, utilizing a flow transducer, in combination with a measuring fixture whose flow resistance is a function of the mean diameter of the elongated solid being tested.

Although the invention is suitable for use in measuring the mean diameter of wire, cable, etc., for convenience it will be described with particular reference to the measurement of the denier of fibers.

The term "denier" is defined as the measurement of the weight in grams of 9000 meters of textile thread under specified conditions of moisture content. Although various other units of measurement are used in describing the heaviness of different kinds of thread, denier is the most common in the synthetic fiber industry. However, the invention is suitable for measuring all types of threads and the results of the measurements may be interpreted in any system of units.

Since textile fibers of a given type have constant composition and manufacturing method, the density is relatively constant over long lengths so long as their moisture and monomer contents do not vary. Therefore, the denier may be accurately inferred from the average cross-sectional area of the fiber.

It is well known in the prior art to use fluids, particularly gases, to measure mechanical dimensions. The most common technique involves the measurement of back pressure in a flow limited stream whose outlet orifice is the clearance between the sample and a test fixture. A more flexible but less used technique utilizes an unlimited flow of air from a constant pressure source which flow is divided into two streams, each stream passing through a separate flow limiting resistance, generally an orifice, then passing by a pressure measurement tap, and finally passing through a second flow resistance before issuing to the atmosphere or, in some cases, to a vacuum source. One of the flow resistances may be the clearance between the sample and a test fixture and another may be an adjustable orifice. The pressure difference between the two taps is usually measured with a manometer or a diaphragm gauge. Such apparatus is described in U.S. Patent No. 2,516,932, issued to Lawrence Wainwright on August 1, 1950. However, the disadvantages of these devices have been so great as to severely limit their commercial application.

The greatest disadvantage of these known devices has been their inherent delicacy coupled with insensitivity. To overcome the insensitivity problem, amplification of signals generated at the manometer, diaphragm or bellows gauge has been employed. However, such an arrangement suffers the disadvantages of increased sensitivity to vibration of these signal generating elements, increased inaccuracies due to friction, and fragility to conditions such as momentary over-pressure.

Other disadvantages of prior art devices include the impracticalities of locating the material tested in a measuring fixture, cleaning, and maintaining instrument accuracy over long periods of use, etc. As a result, such known devices have been capable only of laboratory, or perhaps pilot plant use, where relatively great attention to their operation can be provided by highly trained personnel and where relatively high cost per signal channel is permissible. These have constituted severe disadvantages and limitations.

It is therefore an object of the invention to overcome the disadvantages of prior art devices and to provide a simple, rugged, reliable, sensitive and inexpensive means for measuring the average diameter of moving thread to thereby determine its denier.

Another object is to provide a denier measuring device which may be incorporated in a fixed or a portable arrangement.

An additional object of the invention is to provide a measuring fixture in which the thread being sampled is rapidly and accurately positioned.

A further object is to provide a pneumatic bridge responsive to flow, rather than to pressure, in order to indicate the balance of the bridge.

Further objects and the entire scope of the invention will become more fully apparent when considered in light of the following detailed description of illustrative embodiments of this invention and from the appended claims.

The illustrative embodiments may be best understood by reference to the accompanying drawings wherein:

FIGURE 1 is a schematic diagram of a pneumatic bridge as employed in the invented apparatus;

FIGURE 2 is a schematic diagram of the differential flow transducer and its associated circuit as employed in the pneumatic bridge schematically illustrated in FIGURE 1;

FIGURE 3 is a view in perspective of a preferred embodiment of a stationary denier measuring fixture as employed in the invented apparatus;

FIGURE 3a is an enlarged view in perspective of the two measuring elements of the measuring fixture illustrated in FIGURE 3;

FIGURE 4 is a view in perspective of a preferred embodiment of a pneumatic measuring bridge, partially exploded, the differential flow transducer being schematically illustrated;

FIGURE 5 is a view in perspective of another embodiment of the invention illustrating the measuring fixture and the pneumatic measuring bridge in a portable device; and FIGURE 5a is an enlarged view in perspective of the measuring fixture of the portable device of FIGURE 5, the lower half of the measuring fixture being shown in section.

Briefly, the invention comprises a split-block measuring fixture in combination with a pneumatic bridge having a differential flow meter therein. The measuring fixture is provided with an elongated channel through which the thread to be measured travels, this channel being in fluid communication with the bridge. With the bridge in balance for a prescribed diameter of thread, a particular amount of air flows through the channel about the thread. As the size of the thread varies, the flow through the channel changes thereby disturbing the balance of the bridge. The variations from the balanced condition serve to actuate suitably calibrated indicating means which shows the denier of the thread being measured.

Referring first to the schematic diagram comprising FIGURE 1, the operation of a pneumatic bridge, such as that on which the invention depends, may be briefly described. An air input from an inexhaustible source is supplied to the bridge at a constant absolute value higher than the outputs from the bridge to an unfillable "sink," such as the atmosphere. The air input is divided within the bridge into two streams which pass through first flow resistances 11 and 12 and second flow resistances 13 and 14 respectively. Connected between each of the streams is a differential transducer 15 positioned between the first and second flow resistances. Assuming that the pressure difference between the source and the sink is large, that all four orifices are equal in flow resistance, that the friction in the bridge piping is negligible, and that the gas is an ideal one whose flow characteristics are linear, the bridge is in balance with no differential between the streams and therefore no detection by the transducer 15. If, however, the flow resistance of any of the orifices is altered as, for example, that of orifice 13, the differential transducer 15 will detect the resultant disruption of the balance of the bridge caused by the change in the stream flowing through orifice 13. This is true even though the change in flow conditions is small.

The above-described operation of a pneumatic bridge is also achieved even though the four orifices are not equal in flow resistance since by adjustment of any one of the orifices, a null can always be obtained whereby the differential transducer detects no differential.

Further, if while the flow resistances are all equal and the differential transducer is reading zero, the pressure difference between the source and sink changes, the transducer reading will remain the same since the change in the two streams of flow will vary proportionately, the absolute pressures at the two taps rising or falling equally so that the difference between them will remain zero.

In utilizing a pneumatic bridge in the fabrication of fragile materials such as yarn, the pressure considerations of the system must be appreciated. If a high air pressure is employed, the yarn becomes subject to damage due to the pressure, and the high pressure tends to undesirably separate the halves of the measuring fixture. Furthermore, the use of high pressure within a sensitive flow instrument is inherently undesirable because a geometrically small leak not only will strangely affect readings, but the leak will also tend to increase. In addition, compressed air is a relatively expensive medium, and in multiple station installations the losses at high pressures due to small leaks can be costly.

For these reasons, it is undesirable to employ high pressure in denier gauging. However, in low pressure systems, the pressure differentials are small and require highly sensitive pressure differential transducing means. One example of such a transducer is the inclined manometer. However, this device is inherently bulky, unstable unless firmly fastened to a support and is subject to vibrational errors, evaporation and pollution problems. In addition, it can have its liquid blown out of it by a slight overpressure, and most seriously, requires visual reading and exercise of operation judgment and care.

A more practical pressure transducer is a large area bellows or diaphragm device, except that for high sensitivity this becomes bulky, expensive, subject to vibration and readout arm friction errors. Furthermore, a sensitive bellows or diaphragm transducer is easily damaged and/or thrown out of calibration by a slight pressure difference overload.

A further consideration involved in the effective sensitivity of a pneumatic bridge system for denier measurement is the structure of the measuring fixture. In such a fixture air passes co-linearly through a passage containing a portion of the material being tested. In an oversize passage, a small percentage change in material diameter produces only a small percentage change in flow resistance yielding low sensitivity. On the other hand, a very tight channel will easily be clogged by material fragments, dust, oleaginous coatings and the like, and material damage may often occur due to small increases in its diameter. Therefore, the large diameter of the passage is preferable, but an arrangement must be provided to be responsive to the small bridge unbalances occurring with large passage fixtures.

Pressure differential transducers, for the reasons mentioned above, do not provide the answer to the sensitivity problem in light of their many disadvantages as a differential transducer in a denier measuring system.

In copending applications Serial No. 115,651, James M. Benson, filed on June 8, 1961, now Patent Number 3,147,618, and Serial No. 206,245, James M. Benson, filed on June 29, 1962, now Patent Number 3,181,357, both assigned to the assignee hereof, low cost, simple, rugged extremely sensitive pneumatic-to-electric differential flow transducers are disclosed, which are very satisfactory for use in the denier measuring device which constitutes the present invention. These types of transducers, in addition to the above characteristics, have the very desirable advantage of direction sensitivity. This allows a transducer output having a polarity which corresponds to flow direction and amplitude which is a function of flow rate.

FIGURE 2 is a schematic diagram of the differential flow transducer disclosed in Patent Number 3,147,618, previously cited. In the invented device this transducer is positioned in the location designated by element 15 of FIGURE 1. The transducer comprises a conduit 16 (FIGURE 2) extending between the two main flow streams of the bridge. Positioned within conduit 16 is a pair of partitions 18 and 20 having aligned and similarly dimensioned apertures 22 and 24 therein. Mounted within the conduit 16 between the partitions is an electrically conductive baffle 26. On opposite sides of the baffle in alignment with the apertures 22 and 24 are thermocouple elements 28 and 30. These elements are connected in parallel, as shown, to the secondary winding 32 of a transformer which is connected to an A.C. source. Winding 32 is connected to the tap of a resistor 34 across which is connected a meter M.

In operation, the thermocouples 28 and 30 are heated equally by the current supply, this being insured by the proper positioning of the tap on resistor 34. Under a balanced condition of the bridge, there is no air flow through the conduit 16 and accordingly, the meter is at its null position. However, when a differential flow exists in the bridge, a stream of air flows through the conduit passing through one of the orifices to cool its associated thermocouple. The baffle prevents this flow of air from proportionally encountering, and thereby cooling, the other of the thermocouples. Consequently, the cooled thermocouple changes in resistance varying the current through a portion of resistor 34. This results in a deflection of meter M. The direction and magnitude of the flow is indicated by the polarity and magnitude of the voltage recorded by meter M.

FIGURES 3 and 3a show in detail a measuring fixture which is utilized in combination with the differential flow transducer just described to comprise one embodiment of the invention. The measuring fixture illustrated is a stationary mounting which includes a base portion 36 having flanges 38 and 40 adapted to allow fixed mounting of the fixture. The base 36 supports an air inlet connection 42 and has a cavity 44 to firmly receive and hold an ungrooved, planar measuring channel backplate 46 containing an air inlet hole 48 (FIG. 3a) communicating with the air inlet 42. Mounted on base 36 by means of tie-rods 50 and 52 is a cover block 54 having a cavity 56 therein adapted to receive and firmly hold a channel plate 58 in mating relationship with channel backplate 46. Each of tie-rods 50 and 52 which position the base 36 and the cover block 54 is provided with a notch 60. Located between the tie-rods is a rotatively operative knob 62 provided with spring arms 64 which at certain positions of rotation of knob 62 engage the notches 60 to lock the base and cover block together. However, when the spring arms 64 are not forced into the notches 60 the cover block 54 and the base 36 may be separated.

The measuring channel plate 58 and the measuring channel backplate 46 are shown in more detail in FIGURE 3a. These plates are preferably constructed of abrasion resistant material such as porcelain, synthetic sapphire, tungsten carbide or the like and may be cemented into the cavities of their respective mounting members. Channel plate 58 is provided on one face with a measuring channel 66 the cross-section of which, when mated with channel backplate 46, is of the order of magnitude of the material being measured. Channel 66 is provided with an air receiving cavity 68 which, when plates 46 and 58 are mated, forms a continuation of air inlet hole 48. At the outer ends of the channel 66 are provided outwardly flaring V-shaped notches 70 and 72. These notches are both wider and deeper than the main portion of channel 66 and smoothly taper inwardly from their extremities to merge to the configuration of the channel. The notches are very important in properly positioning the material to be measured within the measuring channel 66. With the base 36 and the cover block 54 separated, the cover block is positioned such that the moving material to be measured is moved out of its normal straight path to engage the V-shaped notches 70 and 72. The tension of the moving material causes it to assume the closest approach possible to its natural straight line path. This moves the material down the sides of the notches until the material drops into the main portion of channel 66. The cover block may then be attached to the base as heretofore described.

This structure is extremely advantageous when employed in measuring running lengths of synthetic fiber. With structures of the prior art, it has been virtually impossible to locate the fibers within a measuring fixture since the fibers are moving at very high speeds during production. The fixture design of this invention lends itself to ready use in measuring rapidly moving fibers.

FIGURE 4 illustrates one embodiment of a pneumatic bridge which may be utilized to integrate the measuring fixture and differential flow transducer previously described into a complete unit for measuring the denier of a moving material. Air at a regulated constant pressure is supplied through a filter (not shown) to a connection 74 positioned centrally of a main bridge block member 76. In communication with connection 74 is a channel 78 within block 76, the channel 78 running the entire length of the block. At opposite ends of the channel are mounted removable orifices 80 and 82 which provide the two required flow resistances corresponding to flow resistances 11 and 12 of FIGURE 1. Mounted to the ends of block member 76 are end caps 84 and 86 provided with cavities 88 and 90 respectively. End cap 84 is pneumatically connected directly or through tubing with the air inlet connection 42 of the measuring fixture shown in FIGURE 3. This measuring fixture is analogous to flow resistance 13 described with reference to FIGURE 1. End cap 86 communicates with a calibrated orifice, preferably an adjustable precision needle valve (not shown). Such a calibrated orifice corresponds to flow resistance 14 of FIGURE 1. In addition to communicating with channel 78, cavities 88 and 90 also communicate with channel 92 which extends through the length of bridge block 76. Within channel 92 is a differential flow transducer 94 as described with reference to FIGURE 2. This transducer corresponds, with relationship to pneumatic bridge operation, to the transducer 15 of FIGURE 1. The output of transducer 94 is connected to a calibrated meter (not shown).

In operation, the pneumatic bridge is balanced for a particular denier. Air supplied to connection 74 divides into two streams in channel 78 passing through flow resistances 80 and 82 and into cavities 88 and 90 respectively. Air flows from cavity 88 to the measuring fixture and passes along channel 66 between the walls thereof and the material being measured to exit to the atmosphere. Air in cavity 90 passes through the calibrated orifice to the atmosphere. When the material being measured is of the denier corresponding to the balance of the bridge, no air flows through channel 92 to the differential flow transducer 94. Therefore, the calibrated meter associated with the meter is not affected and accordingly indicates the denier for which the bridge is balanced. However, when the mean diameter of the material being tested varies, the flow through the measuring fixture also varies as a function of the change in mean diameter. This disrupts the balance of the bridge and a differential air flow between cavities 88 and 90 occurs through channel 92. This flow is sensed by transducer 94 to appropriately indicate the change in denier on the calibrated meter. By minimizing the size of the bridge network rapid response to denier changes is obtained.

In FIGURE 5 there is illustrated a second embodiment of the invention, this embodiment adapted for portable use as contrasted with the prior embodiment in which the measuring fixture is stationary. Air from an inexhaustible constant pressure source is supplied to bridge block 96 through a connection 98 containing a small filter (not shown). Bridge block 96 is structurally similar to bridge block 76 of FIGURE 4 except for the positioning of element 100 uniting the differential flow transducer to its associated meter 102. End cap 104 is provided with an integral adjustable needle valve having an adjustment knob 106 and a locking lever 108. Member 110 of the portable device corresponds to end cap 84 of the bridge structure of FIGURE 4. Within member 110 is positioned a rotary valve 112 operated by a lever 114 and a link 116 connected to a trigger-like handle 118 pivotally mounted to member 110. Compression spring 120 normally holds the handle in a position shown in FIGURE 5 wherein the rotary valve 112 is positioned to transmit air from bridge block 96 via tubing 122 (only a portion of which appears in the drawing) to the measuring fixture 124. When the handle 118 is squeezed to move in the direction indicated by the arrow in FIGURE 5, rotary valve 112 is rotated to connect bridge black 96 to an orifice 126 thereby preventing air from flowing from the bridge block to the measuring fixture for a purpose to be described hereinafter.

The measuring fixture 124 is joined to, and is operatively associated with, member 110. To member 110 is connected a stationary arm 128 to which the upper half of the measuring fixture is attached. To the member 110 there is also pivotally connected parallel levers 130 and 132 between which is mounted a movable support arm 134 carrying the lower half of measuring fixture 124. To the free ends of levers 130 and 132 are pivotally connected links 136 and 138 which are also pivotally joined to handle 118 to transmit motion of the handle to a pivoting movement of support arm 134.

The measuring fixture 124 in FIGURE 5 may be more completely described with reference to FIGURE 5a which illustrates an enlarged perspective view of the fixture, partially in section. As stated previously, to stationary support arm 128 the upper half of fixture 124 is mounted, while the bottom half is mounted on movable support arm 134. The measuring fixture 124 operates similarly to that shown in FIGURE 3 but is structurally somewhat modified. Air is transmitted to the base block 136 by means of tubing 122. Firmly held within a cavity in block 136 is the channel plate 138 having a measuring channel 140 and material positioning notches 142 (only one of which is shown) at opposite ends thereof. The tubing 122 communicates with channel 140 by a passage 144 extending through base 136 and channel plate 138. The bottom half of fixture 124 comprises a cover block 146 having a recess in which a channel backplate 148 is mounted. This channel backplate is provided with a cavity 150 in alignment with passage 144. The cover block 146 is cushion-mounted with respect to movable support arm 134 such that it may pivot slightly when brought into mating relationship with base 136. This is accomplished by connecting cover block 146 to a shaft 152 mounted transversely of the support arm 134 within a vertical slot 154 therein, the shaft being fixed to a projection 156 of the cover block 146. A pair of compression springs 158 and 160 on opposite sides of the shaft 152 between the cover block and support arm 134 provides the cushioning effect and causes the cover block to pivot.

The positioning of a moving length of material within the measuring fixture is accomplished in the portable device of FIGURE 5 by squeezing handle 118 to separate the upper and lower halves of measuring fixture 124. This also rotates valve 112 to terminate air flow to the fixture 124 and re-direct it to orifice 126. This minimizes the disturbance of the pneumatic bridge since orifice 126 offers greater flow resistance than passage 144 of the measuring fixture when the latter is opened. By minimizing bridge unbalance, due to threading operations, quicker recovery to correct readings can be obtained, thus significantly increasing utility of the invention. The moving material is then diverted from its straight line path by engagement with the notches 142 of the channel. By the same procedure as in the apparatus of FIGURE 3, the material is positioned within the channel 140. The handle 118 is then released. As the movable support arm 134 is rotated counterclockwise about the pivotal connection of levers 130 and 132 due to the influence of compression spring 120, cover block 146 engages the base 136 and springs 158 and 160 guide the cover block to place the channel backplate 148 tightly against the channel plate 138.

As in the stationary embodiment, the pneumatic bridge is calibrated for balance with a known standard denier material. Thereafter, mean diameter changes of the moving material being tested will vary the readings on the calibrated meter 102 to indicate the changing denier of the material.

Additional features of a device such as that shown in FIGURE 5 include the use of an orifice 126 which is carefully selected in size to produce a meter reading when the fixture 124 is open which is the same as that when the fixture is closed and is measuring the material having a known standard denier. Also knob 106 of the needle valve may be provided with a multi-turn calibration reference micrometer and vernier arrangement and suitable settings for a given channel plate 138 for various denier standards. The base 136 may be made separable from support 128 in order that a series of base-mounted channel plates may be substituted to render the portable assembly adaptable for a wide range of material deniers.

The invented structure, as exemplified by the two embodiments described in detail herein, offers the important advantage of being easy to clean since the measuring channel may quickly be exposed for cleaning purposes. In addition, the pressure flow during normal operation also serves as a cleaning medium.

The above described embodiments are illustrative of preferred embodiments of the invention but are not intended to limit the possibilities of insuring the features of a highly sensitive, compact, and accurate denier measurement device. Examples of other modifications which may be made include the use of output equipment responsive to the differential flow transducer to transform the analog data to digital information and to drive feedback means for re-calibrating the pneumatic bridge to a new condition of balance. The fluid flow measuring devices disclosed herein are examples of arrangements in which the inventive features of this disclosure may be utilized, and it will become apparent to one skilled in the art that certain modifications may be made within the spirit of the invention as defined by the appended claims.

What is claimed is:

1. A fluid flow measuring device for measuring the mean diameter of a length of moving material comprising in combination: a pneumatic bridge having input and output connections, means for connecting a source of fluid supply to said input connection, a measuring fixture joined to said output connection, said measuring fixture comprising a channel plate having a flat surface thereon, a planar channel backplate adapted for mating relationship with the flat surface of said channel plate, said flat surface being provided with an elongated channel, said channel having outwardly flaring V-shaped notches at its ends, means external to said channel plate and channel backplate for detachably securing said plates in mating relationship, means for passing fluid to said channel substantially at the center thereof, said fluid flowing from said supply to said channel through said bridge, means for passing said moving material through said channel to vary the flow resistance of said channel as a function of the mean diameter of said material, the flow of fluid through said bridge being dependent on the flow resistance of said channel, a flow transducer within said bridge, and indicating means connected to the output of said flow transducer, said flow transducer responsive to variations of flow within said bridge to actuate said indicating means.

2. A fluid flow measuring device as set forth in claim 1 wherein said external securing means includes a pair of support arms, means for mounting said channel plate on one of said support arms, means for mounting said channel backplate on the other of said support arms, and trigger-like means operatively connected to said support arms for separating and mating said channel plate and channel backplate.

3. A fluid flow measuring device for measuring the mean diameter of a length of moving material comprising in combination: a pneumatic bridge having input and output connections, means for connecting a source of fluid supply to said input connection, a measuring fixture joined to said output connection, the flow of fluid through said bridge being dependent on the flow resistance of said measuring fixture, means for passing said moving material with respect to said measuring fixture to vary the flow resistance of said fixture as a function of the mean diameter of said material, and a flow transducer across said bridge, said flow transducer being responsive to variations of flow across said bridge; a flat channel plate and a planar channel backplate comprising said measuring fixture, said channel plate and channel backplate being mated during the measuring of a continuous length of material to present a high flow resistance, means for separating said channel plate and channel backplate to thereby present a low flow resistance, and means operatively related to said separating means to prevent said flow transducer from exposure to the sharp change of the flow resistance of said fixture when said channel plate and said channel backplate are separated.

4. A fluid flow measuring device for measuring the mean diameter of a length of moving material as set forth in claim 3 wherein said means for preventing said flow transducer from exposure to the sharp change of flow resistances comprises a high resistance orifice, valve means positioned between said bridge output connection and said measuring fixture, said valve normally directing the flow of fluid from said bridge to said measuring fixture and operative on actuation of said separating means to divert the flow of fluid from said bridge to said high ressistance orifice.

5. A fluid measuring device for measuring the mean diameter of a length of moving material comprising in combination; a pneumatic bridge, means for connecting a source of fluid supply to said bridge, channel means for dividing said fluid supply into two streams within said bridge, a measuring fixture provided in one of said streams, a variable flow resistance means provided in the other of said streams, the flow of fluid through said bridge being dependent on the flow resistances of said measuring fixture and said variable flow resistance means, the flow of said streams being equal when said bridge is balanced and unequal when unbalanced, means for passing said moving material with respect to said measuring fixture to vary the flow resistance of said fixture as a function of the mean diameter of said material, an additional channel means within said bridge interconnecting said two streams, a flow transducer positioned in said additional channel means, said flow transducer including a baffle, a pair of temperature sensitive elements on opposite sides of said baffle, one of said temperature sensitive elements being responsive to differential flow in one direction between said two streams and the other temperature sensitive element responsive to differential flow in the opposite direction, said differential flow being produced when said bridge is unbalanced, indicating means connected to the output of said flow transducer, and means for connecting said responsive temperature sensitive elements to said indicating means to be actuated as a function of the response of said temperature sensitive elements to differential flow in said additional channel.

References Cited by the Examiner

UNITED STATES PATENTS

| | | | |
|---|---|---|---|
| 1,879,559 | 9/1932 | Smart | 33—147 |
| 2,014,998 | 9/1935 | Baguley et al. | 33—15.4 |
| 2,266,566 | 12/1941 | Poole | 73—174 |
| 2,431,241 | 11/1947 | Godsey | 73—204 X |
| 2,509,889 | 5/1950 | Shockley | 73—204 X |
| 2,516,932 | 8/1950 | Wainwright | 73—37.7 |
| 2,880,609 | 4/1959 | Byrkett et al. | 73—38 |
| 2,986,924 | 6/1961 | Becker | 73—37.5 |

FOREIGN PATENTS 139,849  10/1960  Russia.

LOUIS R. PRINCE, *Primary Examiner.*

ISAAC LISANN, LEO SMILOW, *Examiners.*

FRANK H. THOMSON, *Assistant Examiner.*